(No Model.)

A. WAGGONER.
VEHICLE SPRING.

No. 406,408. Patented July 2, 1889.

Witnesses
M. B. Harris
R. P. Sawyers

Albert Waggoner  Inventor
By his Attorneys
Fitzgerald & Co.

UNITED STATES PATENT OFFICE.

ALBERT WAGGONER, OF COLUMBUS, OHIO, ASSIGNOR OF ONE-HALF TO COTTON H. ALLEN, OF ST. LOUIS, MISSOURI.

VEHICLE-SPRING.

SPECIFICATION forming part of Letters Patent No. 406,408, dated July 2, 1889.

Application filed October 20, 1888. Serial No. 288,625. (No model.)

*To all whom it may concern:*

Be it known that I, ALBERT WAGGONER, a citizen of the United States, residing at Columbus, in the county of Franklin and State of Ohio, have invented certain new and useful Improvements in Vehicle-Springs; and I do hereby declare the following to be a full, clear, and exact description of the invention, such as will enable others skilled in the art to which it appertains to make and use the same.

This invention relates to certain improvements in vehicle-springs; and it has for its objects to provide a spring which forms a secure and elastic support for the body of the vehicle which it is designed to carry, and which will afford the body of the vehicle an easy riding motion.

As ordinarily constructed, vehicle-springs of various descriptions have proved defective for the reason that when compressed the strain is upon the curve or bend thereof, and when the pressure is relieved, as is the case in traveling over rough ground or passing over other obstructions, the springs are liable to break or become injured. In fact, the springs as usually constructed will sustain the compression to which they may be subjected without liability to damage, but upon their resultant expansion they are liable to injury.

The invention is designed to obviate these objections; and to this end it consists in combining with one or more leaves of the spring a hinged connection, to which the body of the vehicle may be connected, and which forms an elastic support for the same, while permitting the spring to work without danger of breakage, either when compressed or released.

The objects above mentioned I obtain by the means illustrated in the accompanying drawings, in which—

Figure 1:
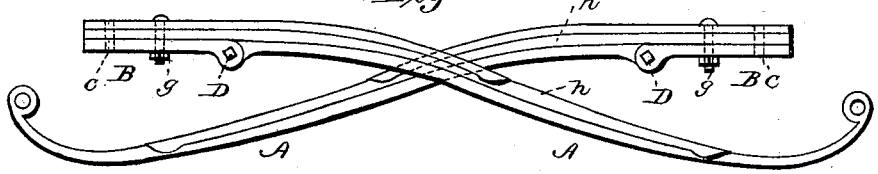
Figure 2:
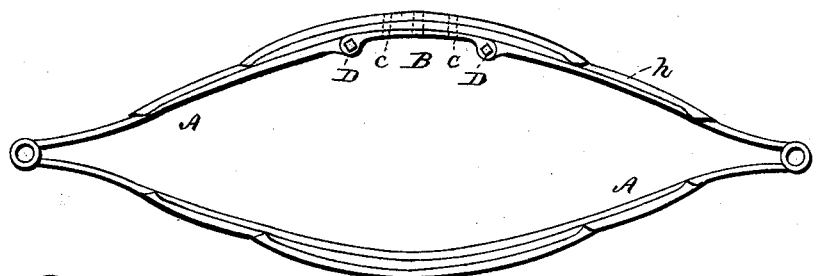
Figure 3:
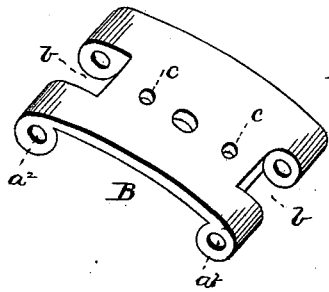
Figure 4:
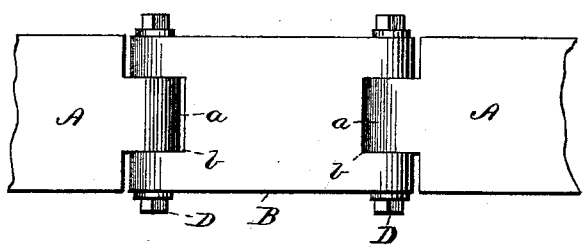

Figure 1 is an end view of a spring embodying my invention. Fig. 2 is an end elevation of an elliptical spring, showing the improvement applied thereto. Fig. 3 is a plan view of the link and spring ends. Fig. 4 is a view of a modified form of spring.

Referring to the drawings, the letter A indicates the leaf of a spring, which is formed with a lug $a$ at end, designed to support the seat of the vehicle, and B indicates a link recessed, as shown at $b$, for the reception of the lug at the end of the spring. The lug $a$ is formed with an eye, and the members at the end of the link are formed with similar eyes $a^2$, through which a connecting-bolt D may be passed to secure the end or ends of the spring to the link. The link is provided with a series of openings $c$, through which the bolts $g$ may be passed to secure the body of the vehicle to the spring, and above said link may be secured the upper leaf $h$ of the spring, or as many of such leaves as may be desired.

I am aware that sectional vehicle-springs having abutting eyes at the ends of their sections have been heretofore used, and I do not claim such a construction in my improved spring.

Having described my invention, what I claim, and desire to secure by Letters Patent, is—

In a vehicle-spring, the combination, with the upper and lower leaves A, the said upper leaf being made in sections and provided with perforated eyes or lugs $a$, of a connecting-link B, provided with recesses $b$, into which fit the eyes or lugs $a$ of the spring, said recesses being located intermediate of the eyes $a^2$, the latter being perforated, the vertical openings $c$ in said link, and the bolts D, passing through the aligned perforations of the eyes or lugs $a$ and $a^2$, as described, for the purpose specified.

In testimony whereof I affix my signature in presence of two witnesses.

ALBERT WAGGONER.

Witnesses:
FRANK A. DAVIS,
LORENZO D. HAGERTY.